US 8,418,136 B2

(12) United States Patent
Gioberti et al.

(10) Patent No.: US 8,418,136 B2
(45) Date of Patent: Apr. 9, 2013

(54) APPLICATION CONTROLLER (75) Inventors: Stefano Pietro Gioberti, London (GB); Gary Alan Thompson, Essex (GB)

(73) Assignee: British Telecommunications public limited company, London (GB)

( * ) Notice: Subject to any disclaimer, the term of this patent is extended or adjusted under 35 U.S.C. 154(b) by 1552 days.

(21) Appl. No.: 11/889,193

(22) Filed: Aug. 9, 2007

(65) Prior Publication Data

US 2008/0059561 A1  Mar. 6, 2008

(30) Foreign Application Priority Data

Aug. 14, 2006 (GB) .................................. 0616135.0

(51) Int. Cl.
*G06F 9/44* (2006.01)
*G06F 15/177* (2006.01)

(52) U.S. Cl.
USPC ............................. 717/120; 717/170; 709/220

(58) Field of Classification Search ........................ None
See application file for complete search history.

(56) References Cited

U.S. PATENT DOCUMENTS

| | | | | |
|---|---|---|---|---|
| 5,321,841 | A * | 6/1994 | East et al. ...................... | 718/107 |
| 6,044,408 | A | 3/2000 | Engstrom et al. | |
| 6,871,345 | B1 * | 3/2005 | Crow et al. .................... | 717/120 |
| 7,340,714 | B2 * | 3/2008 | Upton ............................ | 717/120 |
| 7,523,145 | B2 * | 4/2009 | Willard et al. ................. | 717/170 |
| 7,596,784 | B2 * | 9/2009 | Abrams et al. ................. | 717/120 |
| 7,930,681 | B2 * | 4/2011 | Kloeffer et al. ............... | 717/120 |
| 8,190,715 | B1 * | 5/2012 | Narayanaswamy et al. .. | 709/220 |
| 8,214,451 | B2 * | 7/2012 | Grossner et al. .............. | 717/170 |
| 2002/0065947 | A1 | 5/2002 | Wishoff et al. | |
| 2003/0105884 | A1 * | 6/2003 | Upton ............................ | 709/318 |
| 2006/0075079 | A1 * | 4/2006 | Powers et al. ................. | 709/220 |
| 2007/0006150 | A9 * | 1/2007 | Walmsley ..................... | 717/120 |

FOREIGN PATENT DOCUMENTS

| | | |
|---|---|---|
| GB | 2421102 A | 6/2006 |
| WO | WO 2006/081667 A1 | 8/2006 |

OTHER PUBLICATIONS

Cai Xia; Quality Prediction for Component-Based Software Development: Techniques and A Generic Environment; [online] Dec. 2001; retrieved on Nov. 29, 2012; pp. 1-118; Retrieved from the Internet: <URL: https://docs.google.com/viewer?a=v& q=cache:1TxydvOBBqsJ:citeseerx.ist.psu.edu/viewdoc/download?>.*

Ulrik P. Schultz; Distributed Control Diffusion: Towards a Flexible Programming Paradigm for Modular Robots; [online] Oct. 2007; retrieved on Nov. 29, 2012; pp. 1-9; Retrieved from the Internet: <URL: http://delivery.acm.org/10.1145/1380000/1377887/a15-schultz.pdf?>.*

Delphine Bresch-Pietri et al.; Prediction-based feedback control of a class of processes with input-varying delay; [online] Jun. 2012; retrieved on Nov. 29, 2012; pp. 1-7; Retrieved from the Internet: <URL: http://ieeexplore.ieee.org/stamp/stamp.jsp?tp=& arnumber=6315029>.*

UK Search Report dated Sep. 22, 2006 in GB 0616135.0.

* cited by examiner

*Primary Examiner* — Thuy Dao
*Assistant Examiner* — Hanh T Bui
(74) *Attorney, Agent, or Firm* — Nixon & Vanderhye P.C.

(57) ABSTRACT

The present invention defines a method for assembling software components using an application controller. The application controller provides a conduit through which calling client modules can access functionality provided by various handlers in a manner that results in greater flexibility when additional functionality is required. Additional functionality can be provided to the clients by adding additional handlers to the application controller without the need to modify any of the individual clients. The client will continue invoking the application controller in the same manner as it did previously, whilst the application controller provides additional functionality by accessing the additional handlers. Indeed, the only changes that are required are to an agent, which in preferred embodiments includes a relatively straightforward to modify XML configuration file.

8 Claims, 6 Drawing Sheets

APPLICATION CONTROLLER

FIELD OF THE INVENTION

The present invention relates to a method and system for assembling components in a software system. In particular, the present invention relates to an application controller for providing functionality from various handlers to a client system.

BACKGROUND TO THE INVENTION

Conventionally, software systems are constructed from software components that have fixed compile-time relationships. This means that adding additional logic to such a system requires modification to existing code, and then recompiling before the new code can be deployed and subsequently used.

For example, a program or component that provides reporting functions in relation to some input data will need to be modified if additional functionality is required, such as outputting an additional report. This sort of situation is commonplace, and as systems get more complex with incremental changes to provide additional functionality, then the programs used to implement them also grow ever more complex and progressively begin to degrade and eventually become unmaintainable in terms of cost, time and technical complexity.

Furthermore, there will often be several areas of a system that need to be modified when some additional functionality is needed. Thus, when additional functionality is added to a system, typically many areas of that system will require modification to access this additional functionality.

Various attempts have been made within the software industry to produce more loosely coupled and configurable software architectures such as that adopted by the Apache Software Foundation in its Open Source development of its Web Services engine Axis (see the http site at ws.apache.org/axis). However, these architectures are all tied to a particular problem space, and not applicable in the more general case.

In Axis, the problem that is being solved is how to run code on a remote machine from a local machine with a network in between (specifically, the problem solved by Apache Axis is that of exposing services over the web, i.e. Web services). Axis provides a solution to bridge the gap between the local machine and the remote machine bridging across various, and typically incompatible, protocols. However, Axis merely serves to translate instructions or messages from the local machine into a format that can be implemented over the network and then understood by the remote machine.

SUMMARY OF THE INVENTION

It is the aim of embodiments of the present invention to address one or more of the above-stated problems.

According to a first aspect of the present invention, there is provided a method of assembling components in a software system, said software system comprising a plurality of clients shielded from a plurality of handlers by an application controller, wherein the plurality of handlers provide an implementation of functionality requested by at least one of the clients, said method comprising the steps of:

a) providing, by an agent to a requesting client, a reference to an application controller configured with a set of handlers;

b) constructing a context by the client, said context comprising the input parameters required by the requested functionality;

c) invoking by the client the application controller referenced in step a);

d) iterating over and executing, by the application controller, each of the handlers in the set of handlers, wherein each of the handlers is provided a reference to the context; and e) reading by the client any output from the application controller from the context;

wherein the agent is a common component accessible by all the clients and wherein the agent has access to configuration details of any configured application controller and their associated sets of handlers.

Preferably each handler represents a discrete component of the functionality requested, and at least one handler is reusable by more than one application controller.

The set of handlers may further comprise an exception handler, wherein the exception handler is invoked immediately after any error occurring during the execution of the handlers in step d). The set of handlers may further comprise a finally handler, wherein the finally handler is always executed last out of all the handlers.

An error occurring during the execution of the handlers in step d) may be propagated back to the requesting client.

Preferably, the agent comprises a configuration file. The configuration file may be an XML configuration file.

Thus, in embodiments of the present invention, it is possible to add additional functionality to the system by adding additional handlers to the application controller without the need to modify any of the clients. The client will continue invoking the application controller in the same manner as it did previously, whilst the application controller provides additional functionality by accessing the additional handlers. No changes need to be made to the client module. Indeed, the only changes that are required are to the agent, which in preferred embodiments includes a relatively straightforward to modify XML configuration file.

As such, other features, such as the writing of reports, can be added to the system by adding a suitable handler and reference to that handler in the XML configuration file, without needing to update any of the other components, including the client. This is particularly important when there are many different client programs calling the modified assembly, which would otherwise all have to be modified individually without utilising embodiments of the present invention.

Therefore, the software architecture that this invention relates to is extensible by virtue that it provides the ability to plug together software components into an arbitrarily complex assembly. In this way, it is possible to quickly build software assemblies using libraries of smaller specialised and re-usable components that can deliver some fairly complex behaviours. Being based on principles of loose coupling and extensibility through a data-driven configuration by using an agent (compared with program or code-driven), the current invention supports agile organisations. Agile organisations react constantly and quickly to changes in their domain of operation, and require systems that can exhibit the same change characteristics. By re-configuring an assembly, and possibly adding further software components to the assembly, the present invention supports this rapid and constant change of requirements that occurs as an agile organisation moves to respond and react to changing technical and business requirements.

However, the system still offers the same configurability advantages when implemented in a code-driven configuration, as the resulting assembly still provides for a generic agent interface that is easily accessible by all clients.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

The current invention is directed at supporting the configuration of software assemblies from smaller single-purposed components known as handlers.

Though the examples later in this document will illustrate the capabilities of the current invention by looking at applications of the current invention to certain problem domains, this is in no means intended to imply that the current invention is limited to use in these domains.

The table below lists acronyms and abbreviations used in the following description:

TABLE 1

Acronyms and Abbreviations

| AOP | Aspect-Oriented Programming. A development approach that allows for code which delivers cross-cutting capabilities to be factored out separately instead of being embedded directly in the code. |
| GMP | Generalised Message Processor |
| Jexl | Java Expression Language |
| J2EE | Java 2 Enterprise Edition |
| JMS | Java Messaging Service |
| MDB | A J2EE Message-Driven Bean |
| MSE | Multi-Staged Enrichment |
| NaN | Not a Number. An abbreviation used to refer to numeric values that cannot be represented simply as numbers (e.g complex numbers and infinity) |
| TCF | Try-Catch-Finally. An exception handling model popularised by languages such as C++ and Java |
| UML | Unified Modelling Language. A diagrammatic language for modelling software systems |
| XML | eXtensible Markup Language |
| XPath | A query language (like SQL) that describes how to locate elements and attributes in an XML document. |

The following examples are described with reference to the Java programming language and XML. However, the invention is not limited to Java. A person skilled in the art will appreciate that other programming languages can be used to implement the steps of the invention, such as C++.

Figure 1:
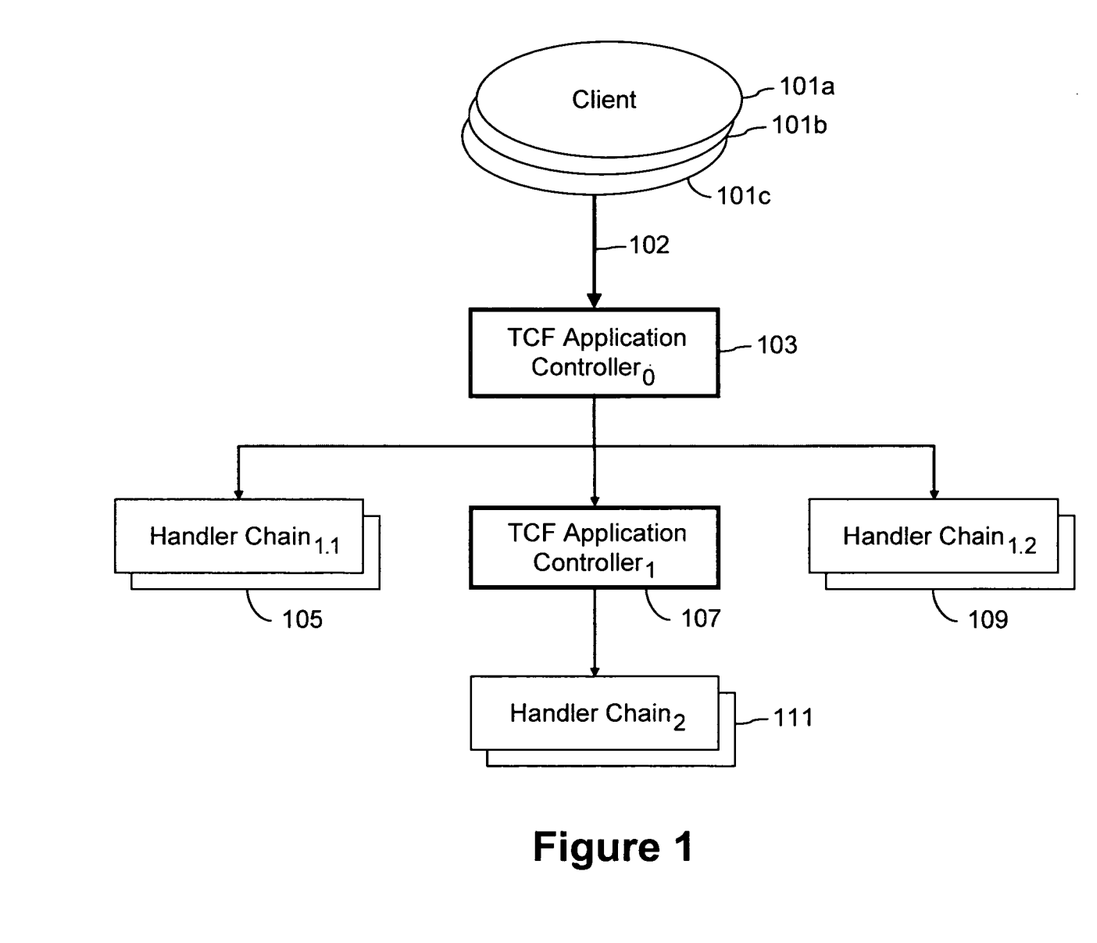
FIG. 1 is a block diagram depicting a typical hierarchical software assembly of components in terms of the preferred embodiment of the current invention.

FIG. 1 is a block diagram depicting a typical hierarchical software assembly of components in a preferred embodiment of the current invention. FIG. 1 comprises a series of clients 101$a$, 101$b$ and 101$c$, a TCF Application Controller 103, Handler Chain$_{1.2}$ 105, TCF Application Controller$_1$ 107, Handler Chain$_2$ 111, Handler Chain$_{1.2}$ 109.

Any one of the clients, say client 101$a$, can make a request 102 to invoke TCF Application Controller$_0$ 103 by passing request data to it in a context as part of the invocation. A "context" is a technique used in JAVA (and also in many other programming languages) that allows different components to share data. So here, passing a context would have the effect of passing some data, such as a string, into the invoked TCF Application Controller$_0$ 103.

Once invoked, TCF Application Controller$_0$ 103 cycles through all the handlers with which it has been configured. The term handler is used generally to refer to any program/module that implements the Handler interface (see FIG. 3). In this example, the TCF application controllers 103 and 107 and the Handler Chains 105, 111 and 109 can all be considered as handlers. So, in this example, the TCF Application Controller$_0$ 103 cycles through Handler Chain$_{1.2}$ 105, TCF Application Controller1 107 and Handler Chain$_{1.2}$ 109.

For each invocation of a handler, the TCF Application Controller$_0$ 103 passes on the context which it received as part of its own invocation by the client 101$a$. Because the handler TCF Application Controller$_1$ 107 is itself a TCF Application Controller like that of TCF Application Controller$_0$ 103, when it is invoked, it initiates a serial invocation of all the handlers (Handler Chain$_2$ 111), with which it in turn has been configured. The fact that TCF Application Controller$_1$ is a TCF Application Controller is invisible to TCF Application Controller$_0$ which simply treats it like any other handler and invokes it like any other handler.

Each of the TCF Application Controllers 103 and 107 seeks to invoke each of the handlers it has been configured with, in the precise sequence in which they have been configured. This sequence is also referred to as a handler chain. Where an exception (a form of program error) occurs, a TCF Application Controller stops execution of its handler chain. If no specific exception handlers or finally handlers are configured for the controller, then the TCF Application Controller simply propagates the exception at the point it occurs back to its caller.

In summary, where execution of the components, triggered by the client 101$a$ invoking TCF Application Controller$_0$ 103, proceeds without exception, the execution sequence for the assembly illustrated in FIG. 1 is as follows:

i. TCF Application Controller$_0$
 ii. Handler Chain$_{1.1}$
 iii. TCF Application Controller$_1$
 iv. Handler Chain$_2$
 v. Handler Chain$_{1.2}$ One important aspect of the above example, and one that will become more apparent with the examples below, is that the clients 101$a$, 101$b$ and 101$c$ are shielded from the operation of the various handlers by the TCF Application Controller$_0$. Thus, it is possible to add additional functionality to the system by adding additional components to TCF Application Controller$_0$ without the need to modify any of the clients. The clients will continue invoking the TCF Application Controller$_0$ in the same manner as it did previously, whilst the TCF Application Controller$_0$ provides additional functionality by accessing the additional modules. No changes need to be made to the clients.

Figure 2:
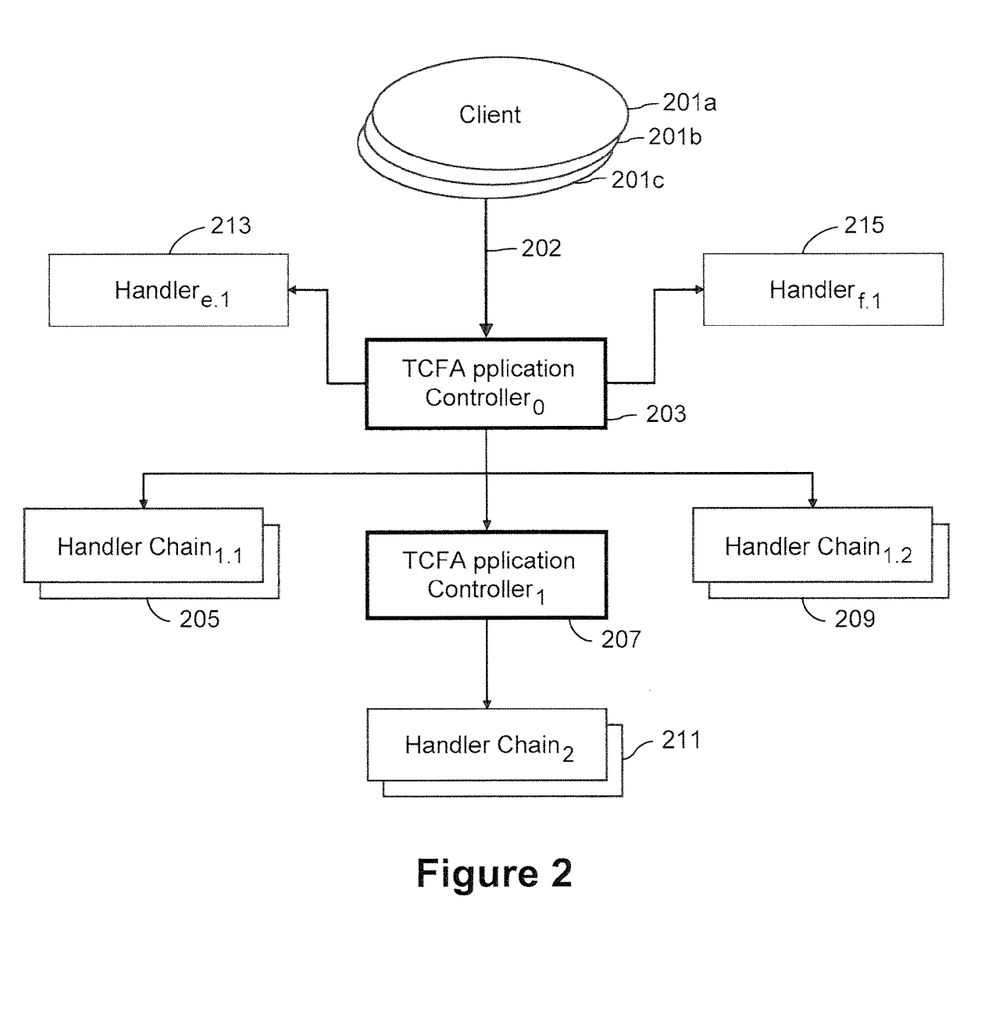
FIG. 2 is a block diagram depicting another assembly of software components configured with both exception and finally handlers.

FIG. 2 is a block diagram depicting a typical hierarchical software assembly of components similar to that depicted in FIG. 1. However, FIG. 2 illustrates how an Application Controller can be configured with the additional functionality of both exception and finally handlers. It should be noted throughout that the client 201 is the same as that of the client in FIG. 1 and thus has not been changed in any way.

FIG. 2 includes all the components shown in FIG. 1 (clients 201$a$, 201$b$ and 201$c$, a TCF Application Controller$_0$ 203, Handler Chain$_{1.2}$ 205, TCF Application Controller$_1$ 207, Handler Chain$_2$ 211, Handler Chain$_{1.2}$ 209) and the addition of an exception handler, Handler$_{e.1}$ 213, and a finally handler, Handler$_{f.1}$ 215.

Execution of the configuration shown in FIG. 2 proceeds in a similar fashion to that described for FIG. 1. The client 201$a$ invokes the TCF Application Controller$_0$ 203 in the same way as it did in FIG. 1. In other words, the client 201$a$ is unaware that the TCF Application Controller$_0$ 203 now has the additional functionality of exception and finally handling.

The following two scenarios illustrate where the exception and finally handlers are invoked.

In the scenario of no exception occurring in the assembly, then the execution sequence is as shown below:

---
i. TCF Application Controller$_0$
ii. Handler Chain$_{1.1}$
iii. TCF Application Controller$_1$
iv. Handler Chain$_2$
v. Handler Chain$_{1.2}$
vi. Handler$_{f.1}$
---

As can be seen, where no exception occurs, the exception handler Handler$_{e.1}$ 213 is not executed. Also in this case, execution of the finally handler Handler$_{f.1}$ 215 occurs after all other handlers have executed.

However, in the scenario where, for example, execution of Handler Chain$_2$ 211 raises an exception, then the execution sequence is as follows:

---
i. TCF Application Controller$_0$
ii. Handler Chain$_{1.1}$
iii. TCF Application Controller$_1$
iv. Handler Chain$_2$
v. Handler$_{e.1}$
vi. Handler$_{f.1}$
---

As can be seen, under this second scenario, Handler Chain$_{1.2}$ 209 is not executed, but instead, the exception handler Handler$_{e.1}$ 213 is executed instead. The exception handler Handler$_{e.1}$ 213 catches the exception wherever it occurred in the handler chain. Also apparent is that the finally handler Handler$_{1.1}$ 215 continues to be executed as the last handler in the assembly.

Whilst these examples show exception and finally handlers configured only against the top-level controller, it is equally possible to configure finally and exception handlers against any controller at any location within the assembly. Furthermore, as will be described later with reference to FIG. 3, it is possible to control whether the TCF Application Controllers propagate detected exceptions to their calling components.

The important point to note is that additional handlers can be added to support additional functionality such as reporting and storing of computed results. This can all be done by adding additional components to the TCF Application Controller$_0$ 203 in a modular manner without needing to modify any of the clients 201$a$, 201$b$ and 201$c$. Indeed, any of the handlers used directly or indirectly by the TCF Application Controller$_0$ 203 can themselves be reused as they are shielded from the rest of the assembly by the TCF Application Controller$_0$ 203 and thus can act as standalone components each used to perform a specific task.

Figure 3:
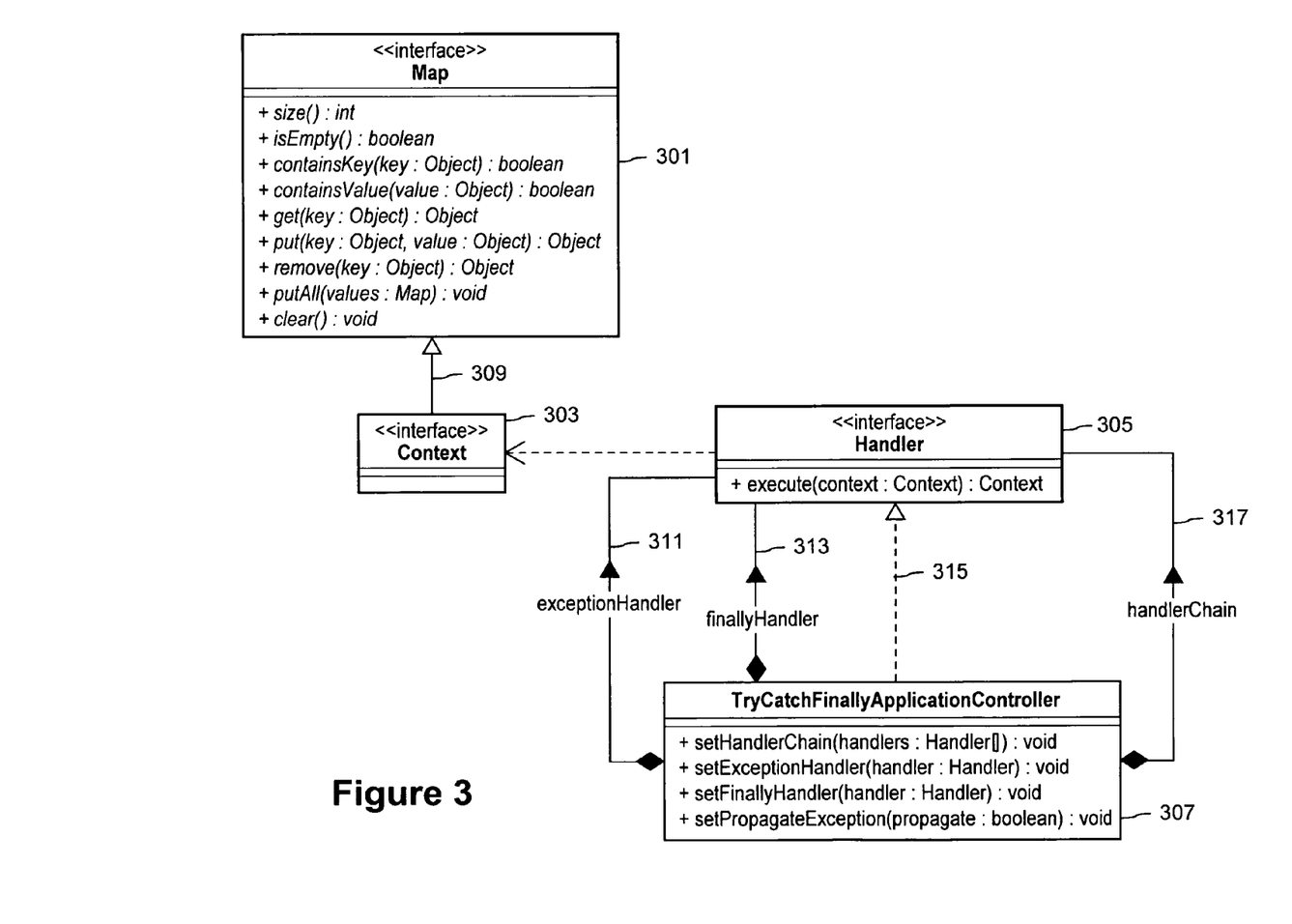
FIG. 3 is a UML class diagram defining the key interfaces and classes used in a preferred embodiment of the present invention.

Reference is now made to FIG. 3, which illustrates a UML class diagram defining the key interfaces and classes used in an embodiment of the present invention. This UML class diagram provides an alternative representation of the system shown in FIG. 2, with specific references to the interfaces and classes.

The Map interface 301 is a Java interface representing an implementation that can map keys to values (see http://java.sun.com/j2se/1.4.2/docs/api/java/util/Map.html).

The Context interface 303 is an interface that extends the Map 301 interface and in the reference implementation described here specifies no additional capability beyond that provided by the Map interface.

The important interface in FIG. 3 is the Handler interface 305. The default executes method on the handler 305 interface 305 is used to execute a method based on a provided context. Thus, a client can simply invoke the executes method associated with a handler without knowledge of the structure or components that are executed as part of the method. This equates in FIG. 2 to the invocation by the client 201$a$ of the TCF Application Controller$_0$ 203, passing to it a context. The client 201$a$ has no knowledge of what other modules or components the TCF Application Controller$_0$ 203 will run (itself an implementation of the Handler interface 305), but can invoke all the components assigned to the TCF Application Controller$_0$ 203 by simply invoking the executes method associated with it.

As discussed, a context (Context 303) is passed to the handler as part of an invocation as illustrated in FIG. 3. The context 303 extends the Java Map 301 interface, which allows a caller to register request parameters under various keys within the Map 301. During execution of a handler, the context is available to the handler both as a source of request parameters, as well as for any output that it may produce. In practice, this allows the handler to "get" and "put" parameters (data) into the context (store) using a key.

The TryCatchFinallyApplicationController class 307 is an abstract class that implements the Handler interface 305, and also supports three properties, which are also defined in terms of the fundamental Handler interface. These are defined by the three "+set . . . (handler . . . )" functions, and represent three instances of the handler interface: HandlerChain, ExceptionHandler, and FinallyHandler.

The HandlerChain property is defined as an array of Handler objects. It is this set of Handler objects that the controller will iterate over when its own executes method is invoked. This equates to the handlers in FIG. 2 of Handler Chain$_{1.2}$ 205, TCF Application Controller$_1$ 207, Handler Chain$_2$ 211, and Handler Chain$_{1.2}$ 209.

The exceptionHandler property is defined in terms of a single instance of type Handler. It is any Handler object registered against this property that the controller will invoke when it detects an exception in executing the Handlers defined in its handlerChain property. This equates to the exception handler, Handler$_{e.1}$ 213 in FIG. 2.

The finallyHandler property is defined in terms of a single instance of type Handler. It is any Handler object registered against this property that the controller will invoke when it completes executing the Handlers defined in its handlerChain property. Any handler registered against this property will always be executed, even if an exception is raised during execution of the handlerChain. This equates to the finally handler, Handler$_{1.1}$ 215 in FIG. 2.

The propagateException property is a simple Boolean property which defines the behaviour of the controller when it encounters an exception during the execution of the handlerChain. Where this property is set to TRUE, then any exception arising from the handlerChain is re-raised (or propagated) back to the controller's caller, such as the client 201a in FIG. 2. Conversely, where this property is false, then any such handlerChain exception is not propagated to the controller's caller. This is effectively used to feedback exceptions to the controller's caller. The following example software assemblies illustrate further the preferred embodiments of the present invention.

EXAMPLE 1

An Assembly that Computes Cube and SquareRoot

The first example demonstrates a software assembly composed of two handlers; one that calculates the cube of a number, and the other that calculates a square root of a number.

These two handler classes are shown below: —

```
1   package com.bt.tcfcontroller.examples;
2   import java.math.BigDecimal;
    import com.bt.tcfcontroller.Context;
    import com.bt.tcfcontroller.Handler;
3   public class CubeHandler implements Handler {
4     private String inputKey = "input";
5     public Context execute(Context request) {
6       BigDecimal input = (BigDecimal) request.get(getInputKey( ));
7       System.out.println(input.multiply(input).multiply(input));
8       return request;
      }
9     public String getInputKey( ) {
10      return inputKey;
      }
11    public void setInputKey(String inputKey) {
12      this.inputKey = inputKey;
      }
    }
```

Code Listing 1: CubeHandler.java Class

```
1   package com.bt.tcfcontroller.examples;
2   import java.math.BigDecimal;
3   import com.bt.tcfcontroller.Context;
    import com.bt.tcfcontroller.Handler;
4   public class SquareRootHandler implements Handler {
5     private String inputKey = "input";
6     public Context execute(Context request) {
7       BigDecimal input = (BigDecimal) request.get(getInputKey( ));
8       System.out.println(Math.sqrt(input.doubleValue( )));
9       return request;
      }
10    public String getInputKey( ) {
11      return inputKey;
      }
12    public void setInputKey(String inputKey) {
13      this.inputKey = inputKey;
      }
    }
```

Code Listing 2: SquareRootHandler.java Class

In both cases, the handlers retrieve the input number that is to be operated upon from the context, and then after having performed the relevant operation, the handler's result is output to the console. The context will be initialised by the component invoking the handler in question, for example by a client invoking the handler and putting an input value into the context.

By configuring a TCF Application Controller, or similar controller, to contain an instance of each of these two handler classes, we can create a controller that will run both handlers upon a single client invocation.

The open source light-weight container Spring (http://www.springframework.org) can be used to configure the controller. The Spring framework is used for exemplary purposes only and is not essential to the invention. However, Spring does provide tooling to wire-up application components based on an XML description. Technically Spring is referred to as a light-weight container that provides dependency injection and AOP services to software components that use it. Thus, by setting out an XML configuration file as shown below in accordance with Spring, we can define the main controller or TCF Application Controller:

```
1   <?xml version="1.0" encoding="UTF-8"?>
2   <!DOCTYPE beans PUBLIC "-//SPRING//DTD BEAN//EN"
3     "http://www.springframework.org/dtd/spring-beans.dtd">
4   <beans>
5     <!-- Handler Assembly definition -->
6     <bean name="example1:handler"
7       class=
        "com.bt.tcfcontroller.TryCatchFinallyApplicationController">
8       <property name="handlerChain">
9         <list>
10          <bean class="com.bt.tcfcontroller.examples.CubeHandler"/>
11          <bean class=
            "com.bt.tcfcontroller.examples.SquareRootHandler"/>
12        </list>
13      </property>
14    </bean>
15  </beans>
```

Code Listing 3: Spring Configuration File example-1-config.xml

In the XML file above, we use the Spring configuration to define the bean example1:handler as an instance of the class TryCatchFinallyApplicationController. This instance is then injected with a value for its handlerChain property (i.e. this instance has its handler chain configured), which is set as a list of two handlers; one being the CubeHandler and the second being the SquareRootHandler.

So, effectively the XML configuration file above does the following with reference to the line numbers in Code listing 3. In lines 6 and 7, example 1:handler is created as an instance of the class TryCatchFinallyApplicationController. At line 8, the configuration file defines a value for the handlerChain property as a list starting line 9. It then cycles through each element of the list on lines 10 and 11 and finds that two handlers have been defined in the class CubeHandler and SquareRootHandler. It thus places these two handlers into the handler chain of example1:handler that has already been defined as a TryCatchFinallyHandler.

Thus, by using the Spring framework, we are able to construct a controller in the form of a TCF Application Controller, where the handler chain is specified in an XML configuration file rather than being manually and explicitly coded into a TCF Application Controller component. This has a significant advantage in that the controller, represented here by example1:handler, can be easily modified to extend the handler chain by simply adding an additional reference to the handler required in the XML configuration file.

With this configuration in place, we can write a small test program to exercise the configuration. This test program, effectively any of the clients 101a, 101b and 101c in FIG. 1, is shown below:

```
1  package com.bt.tcfcontroller.examples;
2  import java.math.BigDecimal;
   import org.springframework.context.ApplicationContext;
   import org.springframework.context.support.-
   ClassPathXmlApplicationContext;
   import com.bt.tcfcontroller.Context;
   import com.bt.tcfcontroller.Handler;
   import com.bt.tcfcontroller.SimpleContext;
3  public class Example1Tester {
4    public static void main(String[] args) {
5      ApplicationContext c = new ClassPathXmlApplicationContext(
           "com/bt/tcfcontroller/examples/example-1-config.xml");
6      Handler handler = (Handler)c.getBean("example1:handler");
7      Context context = new SimpleContext( );
8      context.put("input", new BigDecimal("2.0"));
9      handler.execute(context);
     }
   }
```

Code Listing 4: Example 1 Client Test Program

In the test program above, and specifically on line 5, a Spring ApplicationContext is created from the XML configuration file as presented in Code listing 3. From this Spring application context, the test program proceeds to locate and access the example1:handler bean in line 6 using the getBean function. This effectively locates the XML configuration file and runs through it to create the example1:handler. The example1:handler is then invoked in line 9 using a context that contains the number "2.0" under the key "input" as presented in lines 7 and 8.

By running the example1tester program provided in Code listing 4, the following output is produced, which shows that the two handlers are both invoked in turn:

```
8.000
1.4142135623730951
```

EXAMPLE 1 Output

As shown in Code listing 4 and specifically in line 9, the client test program simply invokes the example1:handler and all the handlers associated with it by using the execute( ) method and passing through a context with the value 2.0.

To illustrate how additional functionality can be added to the assembly in a manner that is totally transparent to the client test program, we can write a third handler SquareHandler, which outputs the square of a number. This is configured into the Spring XML configuration file example-1-config.xml, as shown below (this configuration file is saved as "example-1-congif.xml" in a specified location as illustrated on line 5 in Example code listing 4):

```
1  <?xml version="1.0" encoding="UTF-8"?>
   <!DOCTYPE beans PUBLIC "-//SPRING//DTD BEAN//EN"
   "http://www.springframework.org/dtd/spring-beans.dtd">
2  <beans>
3  <!-- Handler Assembly definition -->
4  <bean name="example1:handler"
5    class=
     "com.bt.tcfcontroller.TryCatchFinallyApplicationController">
6    <property name="handlerChain">
7      <list>
8        <bean class="com.bt.tcfcontroller.examples.CubeHandler"/>
9        <bean
         class="com.bt.tcfcontroller.examples.SquareRootHandler"/>
10       <bean class="com.bt.tcfcontroller.examples.SquareHandler"/>
11     </list>
12   </property>
13 </bean>
14 </beans>
```

Code Listing 5: Example 1 Spring Configuration File Containing SquareHandler

Without changing and recompiling the client test program; we can re-run the assembly with the new Spring configuration file shown above in Code listing 5 to produce the following output:

```
8.000
1.4142135623730951
4.00
```

EXAMPLE 1 Output with SquareHandler

So put simply, the test class Example1 Tester, which represents a general client of the software assembly, can be configured in a totally non-intrusive manner to add to the functionality that it invokes via the assembly. This is done simply by adding to the list of handlers in the Spring configuration file without having to modify the client itself. Moreover, when several clients start using the assembly, the advantage of modifying the assembly in only one place, and by simply amending an XML file, becomes even more apparent. There is no need to modify the client program, and in practice potentially many client programs, to introduce additional functionality.

EXAMPLE 2

Proxied Assembly

When we re-run the example presented above (example 1) using a negative number as input (for example –"2.0"), we notice the following style of output: —

```
-8.000
NaN
4.00
```

EXAMPLE 2 Output with "−2.0" Input

We see here that the SquareRootHandler has produced the output NaN (Not a Number), as it tries to calculate the square root of −2.0 with the second handler. This helps us realise that what we'd like is to have any negative numbers converted to the corresponding positive number before our assembly is invoked. However, we do not want to change the Square-RootHandler, as there will be cases where we do want the SquareRootHandler to process negative numbers. Furthermore, we would also not like to change the client code either. What we can do instead is to absorb the assembly presented earlier, namely the XML configuration file which is used to define the controller, into a second parent assembly that has a handler that converts any negative numeric input to the corresponding positive numeric input prior to being passed to our original assembly that is now configured as a sub-assembly.

The new Spring configuration is shown below:

```
1   <?xml version="1.0" encoding="UTF-8"?>
    <!DOCTYPE beans PUBLIC "-//SPRING//DTD BEAN//EN"
    "http://www.springframework.org/dtd/spring-beans.dtd">
2   <beans>
3     <!-- Handler Assembly definition -->
4     <bean name="example2:handler"
5       class=
        "com.bt.tcfcontroller.TryCatchFinallyApplicationController">
6       <property name="handlerChain">
7         <list>
8           <bean
            class="com.bt.tcfcontroller.examples.AbsoluteHandler"/>
9           <ref bean="example2:handler:proxied"/>
10        </list>
11      </property>
12    </bean>
13    <bean name="example2:handler:proxied"
14      class=
        "com.bt.tcfcontroller.TryCatchFinallyApplicationController">
15      <property name="handlerChain">
16        <list>
17          <bean
            class="com.bt.tcfcontroller.examples.CubeHandler"/>
18          <bean class=
            "com.bt.tcfcontroller.examples.SquareRootHandler"/>
19          <bean
            class="com.bt.tcfcontroller.examples.SquareHandler"/>
20        </list>
21      </property>
22    </bean>
23  </beans>
```

Code Listing 6: Example 2 Spring Configuration File Containing a Proxy

In this new configuration, we see that the bean example2: handler contains two handlers in its handlerChain propery. The first handler is an instance of a new handler class called AbsoluteHandler, which is shown below in Code listing 7. The second handler is actually the original software assembly that has been re-named "example2:proxied". This last handler is identical (except in name) to the bean "example1" presented earlier.

```
1   package com.bt.tcfcontroller.examples;
2   import java.math.BigDecimal;
    import com.bt.tcfcontroller.Context;
    import com.bt.tcfcontroller.Handler;
3   public class AbsoluteHandler implements Handler {
4     private String inputKey = "input";
5     public Context execute(Context request) {
6       BigDecimal input = (BigDecimal) request.get(getInputKey( ));
7       request.put(getInputKey( ), input.abs( ));
8       System.out.println("updating context input
        [" +input + "] with [" + input.abs( ) + "]");
9       return request;
      }
10    public String getInputKey( ) {
11      return inputKey;
      }
12    public void setInputKey(String inputKey) {
13      this.inputKey = inputKey;
      }
    }
```

Code Listing 7: AbsoluteHandler.java Class

With this change in place, the output from running the example is now as shown below:

```
Updating context input [−2.0] with [2.0]
8.000
1.4142135623730951
4.00
```

Example 2 Output with "−2.0" Input and Proxied Handler

The new assembly "intercepts" any negative values in the request context and substitutes the corresponding positive value prior to the execution of the sub-assembly named "example2:handler:proxied".

Alternatively, the behaviour described above can be implemented by modifying the original XML configuration file to include a new handler, the AbsoluteHandler, that runs ahead of the original handlers in the handler chain list. However, this example illustrates how the controller model can support the concept of proxying.

Again, the point to note here is that the client does not need to be modified to include this additional feature. Indeed, other features, such as the writing of reports, can be added to the assembly by adding a suitable handler and reference to that handler in the XML configuration file, without needing to update any of the other components, including the client program. Again, this is particularly important when there are many numbers of client program (see 101a, 101b, 101c in FIG. 1) calling the modified assembly, which would otherwise all have to be modified.

EXAMPLE 3

Usage of Exception and Finally Handlers

In this example, an exception is deliberately generated within the software assembly, and caught with an exception handler for the purposes of logging the exception. This often happens in systems where errors are logged and later reported back to a user or manager of the system for example.

This is done by passing in a String object, rather than a numeric object (of type BigDecimal) into the assembly, which will cause a type conversion error in the example handlers defined above.

Setting up the following Spring configuration below in Code listing 8, a new ExceptionEchoHandler handler and also a FinallyEchoHandler handler are added.

```
1   <?xml version="1.0" encoding="UTF-8"?>
    <!DOCTYPE beans PUBLIC "-//SPRING//DTD BEAN//EN"
    "http://www.springframework.org/dtd/spring-beans.dtd">
2   <beans>
3     <!-- Handler Assembly definition -->
4     <bean name="example3:handler"
5       class=
    "com.bt.tcfcontroller.TryCatchFinallyApplicationController">
6       <property name="handlerChain">
7         <list>
8           <bean
              class="com.bt.tcfcontroller.examples.CubeHandler"/>
9           <bean class=
              "com.bt.tcfcontroller.examples.SquareRootHandler"/>
10          <bean
              class="com.bt.tcfcontroller.examples.SquareHandler"/>
11        </list>
12      </property>
13      <property name="exceptionHandler">
14        <bean class=
              "com.bt.tcfcontroller.examples.ExceptionEchoHandler"/>
15      </property>
16      <property name="finallyHandler">
17        <bean class=
              "com.bt.tcfcontroller.examples.FinallyEchoHandler"/>
18      </property>
19    </bean>
20  </beans>
```

Code Listing 8: Example 3 Spring Configuration File with Finally and Exception Handlers The code for the new ExceptionEchoHandler and the FinallyEchoHandler classes is shown below in Code listings 9 and 10:

```
1   package com.bt.tcfcontroller.examples;
2   import com.bt.tcfcontroller.Context;
    import com.bt.tcfcontroller.Handler;
3   public class ExceptionEchoHandler implements Handler {
4     private String exceptionKey = "exception";
5     public Context execute(Context request) {
6       Throwable t = (Throwable) request.get(getExceptionKey( ));
7       System.out.println("*** Exception caught:[\n");
8       t.printStackTrace(System.out);
9       System.out.println("] ***\n");
10      return request;
      }
11    public String getExceptionKey( ) {
12      return exceptionKey;
      }
13    public void setExceptionKey(String exceptionKey) {
14      this.exceptionKey = exceptionKey;
      }
    }
```

Code Listing 9: Example 3 ExceptionEchoHandler.java

```
1   package com.bt.tcfcontroller.examples;
2   import com.bt.tcfcontroller.Context;
    import com.bt.tcfcontroller.Handler;
3   public class FinallyEchoHandler implements Handler {
4     public Context execute(Context request) {
5       System.out.println("*** FinallyEchoHandler invoked ***");
6       return request;
      }
    }
```

Code listing 10: Example 3 FinallyEchoHandler.java

When the configuration shown in Code listing 8 is run using the following client test program, Code listing 11 below, that passes in the String "rubbish" rather than a numeric value (an instance of BigDecimal), the following is output as shown in Output Example 3 below:

```
1   package com.bt.tcfcontroller.examples;
2   import org.springframework.context.ApplicationContext;
    import org.springframework.context.support.-
    ClassPathXmlApplicationContext;
    import com.bt.tcfcontroller.Context;
    import com.bt.tcfcontroller.Handler;
    import com.bt.tcfcontroller.SimpleContext;
3   public class Example3Tester {
4     public static void main(String[ ] args) {
5       ApplicationContext c = new ClassPathXmlApplicationContext(
            "com/bt/tcfcontroller/examples/example-3-config.xml");
6       Handler handler = (Handler)c.getBean("example3:handler");
7       Context context = new SimpleContext( );
8       context.put("input", "rubbish");
9       handler.execute(context);
      }
    }
```

Code listing 11: Example 3 Test Program

```
1   *** Exception caught:[
2   java.lang.ClassCastException
3     at com.bt.tcfcontroller.examples.CubeHandler.-
      execute(CubeHandler.java:11)
4     at      com.bt.tcfcontroller.-
      TryCatchFinallyApplicationController.
5       execute(TryCatchFinallyApplicationController.java:21)
6     at com.bt.tcfcontroller.examples.Example3Tester.-
      main(Example3Tester.java:20)
    ] ***
7   *** FinallyEchoHandler invoked ***
```

Output Example 3 with "rubbish" Input and Exception Handler

EXAMPLE 4

Generalised Message Processing Using TCF Controllers

The examples so far have demonstrated the primary capabilities of the current invention in the context of some simple problems.

The current example describes a real application that the inventors have deployed successfully using a preferred embodiment of the invention.

The general problem presented in this example is that of writing a generalised message processor (GMP) that can (i) receive XML messages, (ii) validate these messages, and then (iii) determine and despatch the processing of the message to a component, or handler, that can be determined dynamically from the message content.

Figure 4:
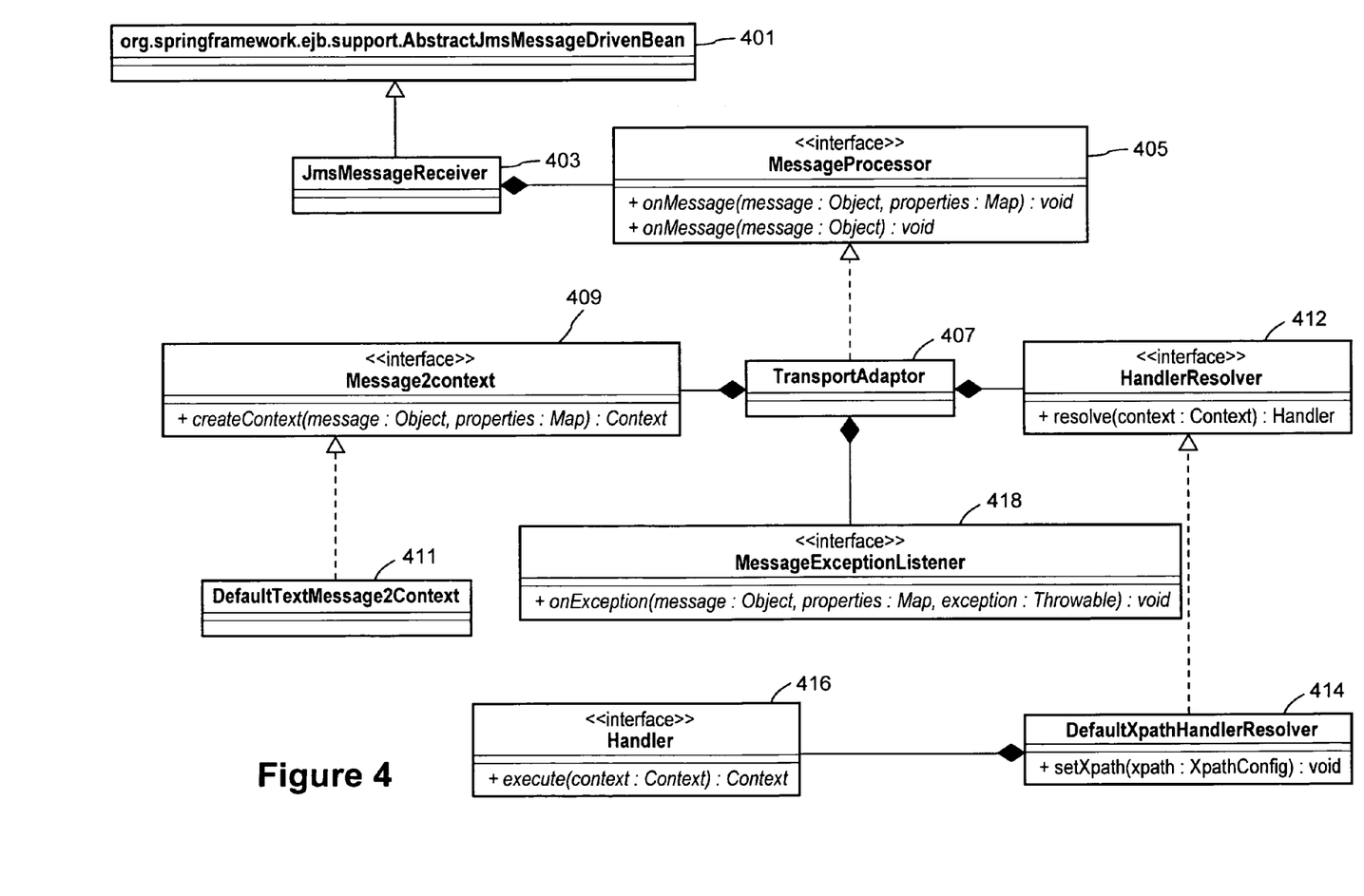
FIG. 4 is a UML class diagram defining an implementation of another example of the present invention for generalised message processing.

The UML diagram in FIG. 4 shows the architecture deployed to solve this problem.

The class AbstractJmsMessageDrivenBean 401 is an abstract class provided by the Spring framework, that supports J2EE MDB deployments. Classes extending this abstract class, such as JmsMessageReceiver 403, can be deployed as J2EE MDBs, and are afforded Spring integration via their parent class.

The MessageProcessor 405 interface provides an abstraction via which arbitrary message processing logic can be exposed via the on Message( ) methods defined as part of the interface.

The TransportAdaptor 407 is the central class in this arrangement. It is a concrete class implementing the MessageProcessor 405 interface, and thus makes itself a suitable candidate for plugging in to the JmsMessageReceiver 403 MDB.

On being invoked, the TransportAdaptor 407 class first invokes a configured class that implements the Message2Context 409 interface. This invocation will both create a context, and place details from the message into the returned context. The details placed into the context may include any message properties, which are a feature of systems operating with JMS messages. The DefaultTextMessage2Context 411 class is an implementation of the Message2Context interface that is used to parse an input XML message, optionally validate it, and place the resulting Document Object Model into the context, which is accessible to other components. The DefaultTextMessage2Context 411 may also place the original XML message into the context and/or optionally place some data, such as meta data, associated with the XML message into the context.

Once the TransportAdaptor 407 has materialised a context in this manner, it invokes a configured HandlerResolver 412. The DefaultXpathHandlerResolver 414 is an implementation of the HandlerResolver 412 interface has the ability to evaluate an Xpath and use the resulting value to map to a configured Handler—an implementation of the Handler 416 interface. It is this Handler that is then despatched to process the inbound request, which now lies in the context by virtue of the work done by the Message2Context 409 implementation, DefaultTextMessage2Context 411 class. Note that it is possible to implement the HandlerResolver interface such that the handler resolution is based upon the value of one or more message properties places into the context by the Message2Context implementation.

The MessageExceptionListener 418 is an interface that allows other components, such as reporting consoles, modules for actioning support engineers, modules for writing logs etc, to be informed of any runtime errors. These may include details of exceptions that are not handled by the exception handlers and even exceptions occurring when an exception handler itself generates an exception.

Figure 6:
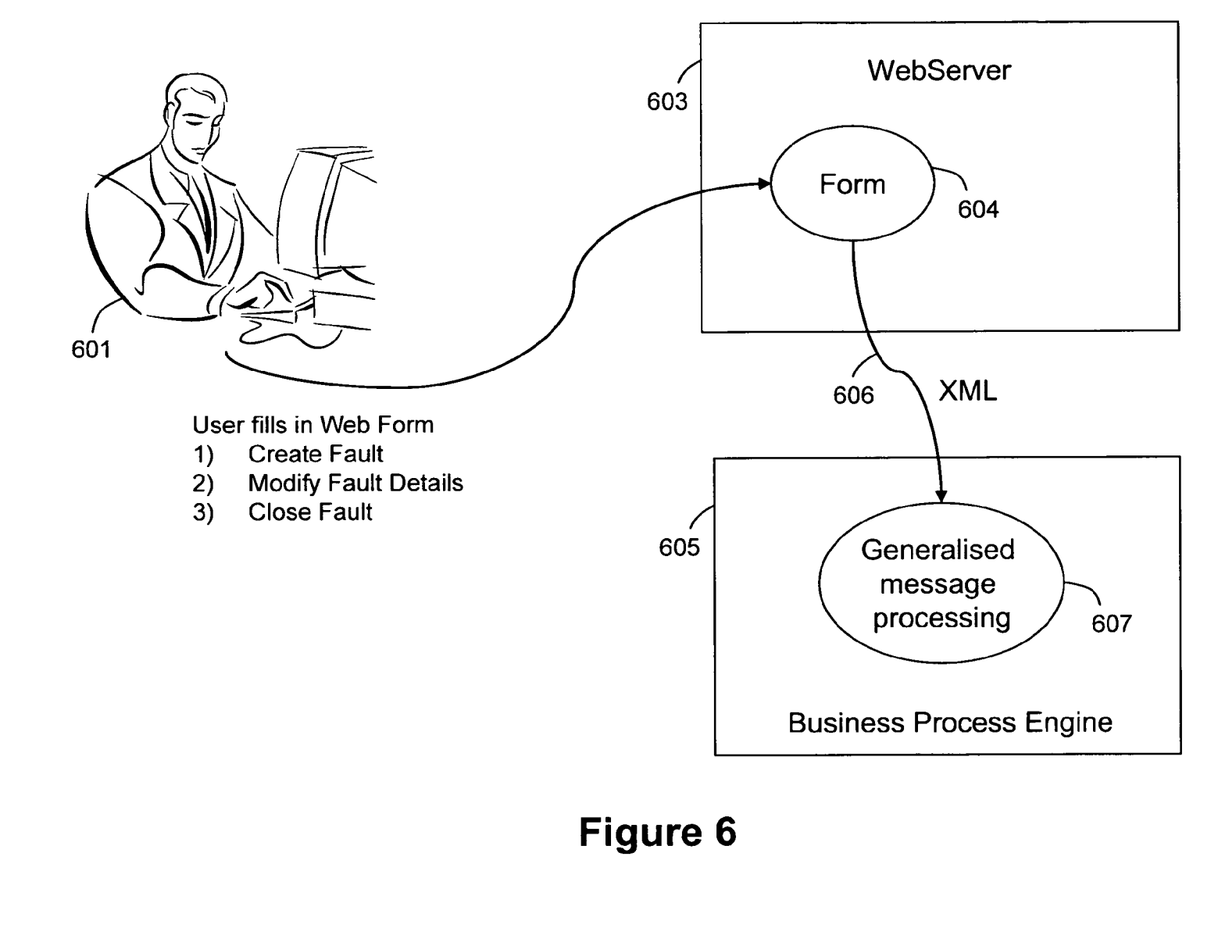
FIG. 6 is a diagram showing an example of the present invention with a user inputting fault details via a web server, which is then processed using a generalised message processor.

To illustrate the general message processing system, consider the following example, where reference is made to FIG. 6 showing a user 601 completing a web-form 604 over the internet on a web server 603.

The completed form 604 is converted into an XML document by a web server 603 and sent 606 to a business process engine 605. The business process engine may be implemented on a suitably configured server for example. The business process engine includes the generalised message processing module 607, which processes XML document as defined by the UML diagram of FIG. 4 and as described in the example below.

The XML message set out in Code listing 12 below represents a simple XML message, like the XML document created by the web server 603 in FIG. 6, which can be used to communicate a customer-perceived fault on a service (i.e. "Create Fault"), and subsequently modify the fault details and finally close the fault. Considering first the example of creating a fault by a user (Steve Gioberti) on-line at a supplier's web site using the web server 603. This XML message is passed onto the generalised message processing module 607 for processing.

```
  <?xml version="1.0"?>
1 <createFault xmlns="http://ccm.intra.bt.com/manageServiceFault/
  2006/06"
          xmlns:stan="http://wsi.nat.bt.com/2005/06/
          StandardHeader/">
2    <stan:standardHeader>
       <stan:serviceAddressing>
         <stan:from>http://ccm.intra.bt.com/crm</stan:from>
         <stan:to>http://ccm.intra.bt.com/neo</stan:to>
         <stan:replyTo>http://ccm.intra.bt.com/crm</stan:replyTo>
         <stan:messageId>1111111111222</stan:messageId>
3        <stan:action>http://ccm.intra.bt.com/fault#create</stan:action>
       </stan:serviceAddressing>
     </stan:standardHeader>
4    <serviceId>some.service.identifier</serviceId>
5    <faultCode>ABC</faultCode>
6    <faultDescription>Intermittent service loss</faultDescription>
7    <contact>
       <firstName>Steve</firstName>
       <lastName>Gioberti</lastName>
       <telephone>020 12345678</telephone>
     </contact>
  </createFault>
```

Code listing 12: XML input message for GMP

The XML message created by the web server 603 and illustrated in Code listing 12 is described in more detail below.

Line 1 contains the XML root element "createFault". This element is the container element for the entire fault-report message.

Line 2 represents the container for a meta-data structure referred to as the "standardHeader". The standard header contains information about where the message has originated (stan:from) together with where any reply should be despatched (stan:replyTo).

Line 3 is particularly important. Here, the stan:action element is used to communicate the type of the message. Specifically, the string http://ccm.intra.bt.com/fault#create is used to indicate that the message represents the intent to create a record of a customer-perceived fault. Other strings can be used to represent other message types, which will all be processed accordingly.

Line 4, identifies the service that the customer is experiencing difficulties with, which is "some.service.identifier" in this example), whilst lines 5 and 6 identify details of the perceived fault.

At line 7, the contact container defines contact details for the customer reporting the fault.

The information contained in the XML message is created by the web server 603 as a result of the information input by the user on a web form.

The XML message 606 is then passed onto the GMP module 607, which is configured to process the message. When the GMP module 607 receives the above XML message, the TransportAdaptor 407 first makes a call to DefaultTextMessage2Context 411 class. This class takes the input XML message string and parses it into an internal representation known as a Document. As part of this parsing process, the input XML string is validated against any XML Schema Definition (XSD), which defines a set of validation rules for the XML. On completion of this step, the TransportAdaptor 407 is returned a Context object primed with the parsed XML Document.

At this point, the TransportAdaptor 407 makes a call to the DefaultXpathHandlerResolver 414 to determine which of possibly many configured Handlers should be used to process the request. Being configured with the Xpath //stan:action, the DefaultXpathHandlerResolver queries the Document in the supplied context, to determine the nature of the request. In this first case, evaluation of the Xpath identifies the action string "http://ccm.intra.bt.com/fault#create". This String, then serves as a lookup key from which the DefaultXpathHandlerResolver determines the appropriate Handler which is to process this message. The appropriate Handler is returned to the TransportAdaptor 407, which then invokes the Handler's execute( ) method; thereby despatching the request.

The configured Handler, then runs the logic needed to confirm the fault, and arrange for its rectification. For example, for the string http://ccm.intra.bt.com/fault#create, the corresponding Handler may be configured to initiate various network tests and process those results to determine the actual fault. During this process, and also at the end of this process, the executing logic can also return status updates to the replyTo endpoint identified in the original XML message.

The following handler chain can be imagined to be configured against "Create TCF" controller for this fault creation case:
1. AuditHandler—saves XML to the database, thus providing an audit trail of all received messages
2. XPathHarvesterHandler—a handler that can be configured with Xpaths to harvest values from the input XML, and save these to a new database record in this case
3. LineTestHandler:—Tests the line, and store the result in the context
4. CreateHandler—Initiates a business workflow to rectify the fault Having dealt with the "Create scenario", we can look at the "Modify Fault" scenario, where a user can input further details about the fault, including details of any site hazards relevant in the event of an engineer visit. Here, we could imagine the following TCF controller configuration: —
1. AuditHandler—saves XML to the database, thus providing an audit trail of all received messages
2. XPathHarvesterHandler—a handler that can be configured with Xpaths to harvest values from the input XML, and have these used to update an existing database record in this case.
3. LineTestHandler: —Tests the line for a second time, and stores the result in the context
4. ModifyHandler—Communicates the update to the running business workflow. Where Hazard details have been entered, then these are communicated to any assigned engineer Finally, the "Close" scenario relates to a user closing an existing fault. Here, only the following handler configuration might be required:
1. AuditHandler—saves XML to the database, thus providing an audit trail of all received messages
2. XPathHarvesterHandler—a handler that can be configured with Xpaths to harvest values from the input XML, and have these used to update an existing database record in this case.
3. CloseHandler—Communicates the closure to any running business workflow, causing it to complete.

Thus, it can be seen that various TCF application controllers can be set up for different purposes or for handling different types of messages. Furthermore, it should also be clear that the different application controllers share some common components/handlers.

EXAMPLE 5

Integrating Message Processing with MSE

The current example describes how the GMP arrangement described above can be integrated with a Multi-Stage Enrichment (MSE) handler, and used to return a response to the requesting system.

Figure 5:
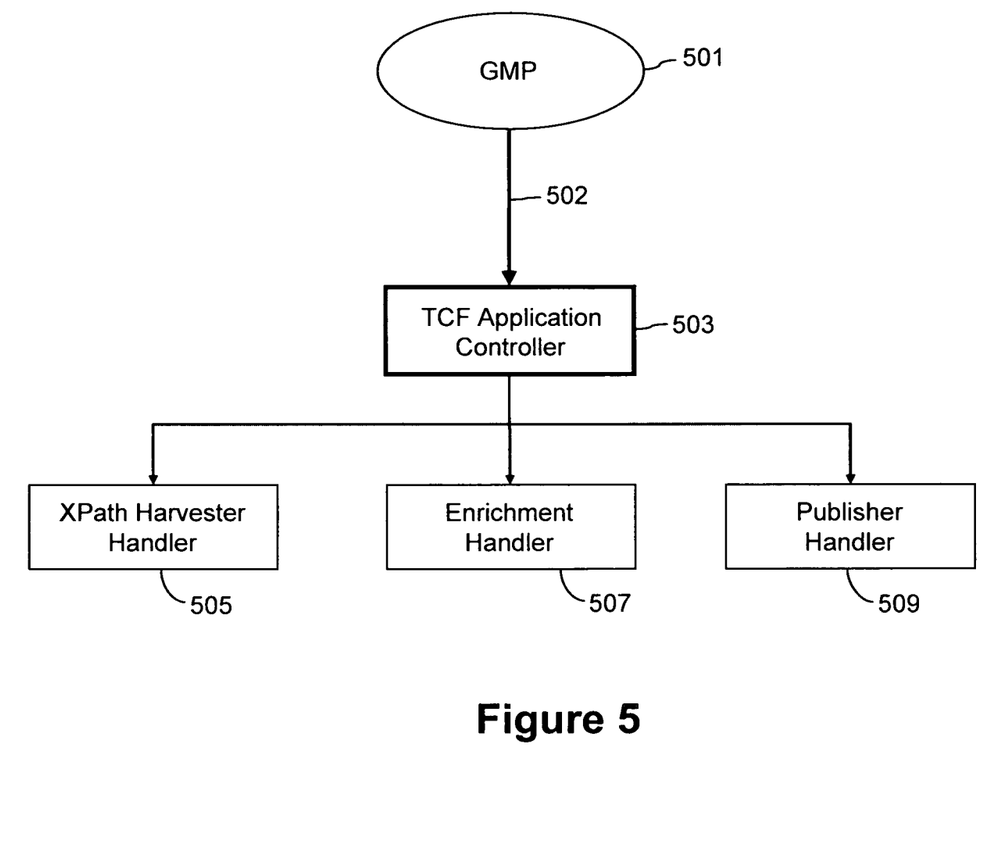
FIG. 5 is a block diagram depicting a hierarchical software assembly of components in another example of the present invention utilising an application controller.

FIG. 5 illustrates how a GMP module 501 can be used to call a TCF application controller 503. The TCF Application Controller 503 can be configured simply with three handlers, an XPath Harvester Handler 505, an Enrichment Handler 507 and a Publisher Handler 509. The XPath Harvester Handler 505 can harvest information from the input XML using a set of configured XPaths, and from these establish a set of required data sources in the context. The Enrichment Handler 507, which has access to the data sources established by the XPath Harvester handler 505 using the established context, and uses these to create a response XML message which is also placed into the context. The final Publisher Handler 509 accesses the response message from the context, and returns this back to the requester via some messaging infrastructure like JMS.

Therefore, embodiments of the present invention simplify the assembly of complex software systems by providing a plug-in based architecture into which simple components can be added to produce an arbitrarily complex hierarchy. In this manner, complex behaviours are very simply achievable through the right configuration of components; with many components being re-used in differing contexts and configurations. These components can effectively map onto business or technical requirements of the system e.g. performing some network operation or just reporting of a completed task. Indeed this approach results in driving the design activity towards making a clearer identification of smaller re-usable components, thus promoting further the opportunities for re-use.

Furthermore, in the application controller, by providing a single controller which multiple clients can call, and placing inside the controller the complex functionality of deciding which further components to call, any changes to the required functionality need only be modified inside the common controller component and not all the individual clients.

By supporting hierarchical assemblies of components, the present invention also makes it possible to readily proxy existing assemblies/components in a non-intrusive manner to them, and indeed to their clients. In this manner capabilities such as logging can be added to an existing assembly in an Aspect Oriented Programming (AOP) manner, simply by plugging the pre-configured assembly into a new assembly that can implement the relevant aspect by running components before and/or after the proxied assembly i.e. existing components do not need to be modified to be added to the system.

Furthermore, the current invention is able to build into its architecture the concept of exception handling and the ability to assemble components hierarchically, which supports further the objective of loose coupling. Each assembly allows for the optional definition of two further assemblies; one to handle any exceptions raised during execution of the primary assembly, and one that is executed under all circumstances after execution of the primary assembly. This approach brings the opportunity for finer levels of control and behaviour, in the same way that it does in standard programming languages such as Java.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of assembling components in a software system, said software system comprising a plurality of clients shielded from a plurality of handlers by an application controller, wherein the plurality of handlers provide an implementation of functionality requested by at least one of the clients, said method comprising:
   a) providing, by an agent to a requesting client, a reference to an application controller configured with a set of handlers;
   b) constructing a context by the requesting client, said context comprising the input parameters required by the requested functionality;
   c) invoking by the requesting client the application controller referenced in a);
   d) iterating over and executing, by the application controller referenced in a), each of the handlers in the set of handlers, wherein each of the handlers is provided a reference to the context; and
   e) reading by the requesting client any output from the application controller from the context;
   wherein the agent is a common component accessible by all the clients and wherein the agent has access to configuration details of any configured application controller and their associated sets of handlers.

2. A method according to claim 1, wherein
each handler represents a discrete component of the functionality requested.

3. A method according to claim 2, wherein
at least one handler is reusable by more than one application controller.

4. A method according to claim 1, wherein
the set of handlers further comprises an exception handler, wherein the exception handler is invoked immediately after any error occurring during the execution of the handlers in d).

5. A method according to claim 1, wherein
the set of handlers further comprises a finally handler, wherein the finally handler is always executed last.

6. A method according to claim 1, wherein
an error occurring during the execution of the handlers in d) is propagated back to the requesting client.

7. A method according to claim 1, wherein
the agent comprises a configuration file.

8. A method according to claim 7, wherein
the configuration file is an extensible markup language (XML) configuration file.

* * * * *